United States Patent [19]

Brauers et al.

[11] Patent Number: 4,796,898
[45] Date of Patent: Jan. 10, 1989

[54] OIL SCRAPER PISTON RING WITH ELLIPTICAL OIL VENT HOLES

[75] Inventors: Bert Brauers; Martin Morsbach, both of Burscheid, Fed. Rep. of Germany

[73] Assignee: Goetze AG, Burscheid, Fed. Rep. of Germany

[21] Appl. No.: 30,321

[22] Filed: Mar. 26, 1987

[51] Int. Cl.⁴ .............................. F16J 9/12; F16J 9/22
[52] U.S. Cl. ...................................... 277/216; 277/140; 267/1.5
[58] Field of Search ................................ 277/138–140, 277/216; 267/1.5

[56] References Cited

U.S. PATENT DOCUMENTS

| | | | |
|---|---|---|---|
| 2,025,299 | 12/1935 | Mitchell | 277/139 |
| 2,124,794 | 7/1938 | Roberts | 267/1.5 |
| 2,400,109 | 5/1946 | Ernst | 277/216 X |
| 2,591,190 | 4/1952 | Olson . | |
| 2,631,908 | 3/1953 | Teetor . | |
| 2,848,288 | 8/1958 | Johnson . | |
| 3,378,268 | 4/1968 | Anderson | 267/1.5 X |
| 3,677,558 | 7/1972 | Sugahara | 277/138 |
| 4,045,036 | 8/1977 | Shunta | 277/138 |
| 4,214,762 | 7/1980 | McCormick et al. . | |
| 4,473,232 | 9/1984 | Umeha et al. | 277/216 |
| 4,497,497 | 2/1985 | Berti | 267/1.5 X |
| 4,522,412 | 6/1985 | Kubo | 277/138 |

Primary Examiner—Robert S. Ward
Attorney, Agent, or Firm—Spencer & Frank

[57] ABSTRACT

Oil scraping piston ring of profiled steel having punched-in oil vent holes. To keep at a minimum the bulging at the holes developed during coiling, the oil vent holes are given an elliptical or rhombic outline.

4 Claims, 1 Drawing Sheet

OIL SCRAPER PISTON RING WITH ELLIPTICAL OIL VENT HOLES

BACKGROUND OF THE INVENTION

The invention relates to an oil scraping piston ring for internal combustion engines, particularly a ring made of profiled steel having at least one web lying against the cylinder wall and a groove made in its exterior circumferential face, with oil vent holes being punched radially into the region of the groove.

To return excess oil into the crankshaft area of internal-combustion engines, oil scraping piston rings are provided with cut or punched in radial oil vent holes. If the oil scraping piston rings are manufactured of a profiled steel band, the oil vent holes are customarily punched in. Due to the low deformation resistance in the region of the holes and the correspondingly low geometrical moment of inertia of the remaining cross section of the steel band, the material bulges out in the region of the holes when bent into ring shape. During the subsequent cylindrical lapping of the rings, more material is removed at the bulges, thus producing larger running face web areas in the region of the bulges. The result is a non-uniform distribution of surface pressure over the circumference of the ring.

The size of the bulges (length of circumference and amplitude) depends on the shape of the hole and on its length or, more precisely, on the curve of the geometrical moment of inertia along the oil vent holes. The greater the length of the hole and the more abrupt the transition of the geometrical moment of inertia at the edge of the hole as a function of the hole geometry, the greater is the amplitude of the bulge.

The oil vent holes disclosed in U.S. Pat. No. 4,522,412 which have a rectangular cross section represent the most unfavorable solution of all conceivable hole geometries. At the edge of the hole, the geometrical moment of inertia of the cross-sectional profile changes suddenly, i.e., it drops to a constant value at the edge of the hole, thus also causing the radius of curvature at the edge of the hole to drop to a constant value. The abrupt transition results in a high bulge amplitude.

An oval oil vent hole disclosed in U.S. Pat. No. 4,214,762 exhibits a softer drop of the geometrical moment of inertia in the region of the hole edge, compared to the rectangular oil vent hole of the same length and width, and thus its radius of curvature decreases in a flatter curve. The bulge amplitude is lower compared to the rectangular cross section, but the running web heights produced during cylindrical lapping of rings from a profiled band provided with oblong, oval holes still is greater in the region of the holes than between the holes.

With respect to these relationships, the round hole, as disclosed in U.S. Pat. No. 2,631,908, represents the best solution. The transition of the geometrical moment of inertia at the edge of the hole is very soft and the length of the hole is minimal so that the bulges resulting during coiling are sufficiently small. However, with round holes it is possible that their small cross sections over time will become plugged due to the formation of residues in the oil, particularly in the operation of diesel engines. Increased oil consumption would be the result. In view of this, it is necessary to change to oblong holes.

SUMMARY OF THE INVENTION

It is therefore the object of the invention to provide a geometry and dimensions for the oil vent holes such that the bulging produced at the holes during coiling of the profiled steel band remains at a minimum.

This is accomplished by the invention in that the oil vent holes have an elliptical or rhombic outline.

With such a shape of the holes, the transition of the geometrical moment of inertia and thus of the radius of curvature in the region of the hole edge is the flattest compared to all other conveivable oblong hole geometries. Geometrical moment of inertia and radius of curvature do not reach their minimum until the center of the hole. The proposed hole geometry produces, as in the round hole, the smallest possible fluctuations in the running web.

DESCRIPTION OF THE PREFERRED EMBODIMENTS

Figures 1, 2:
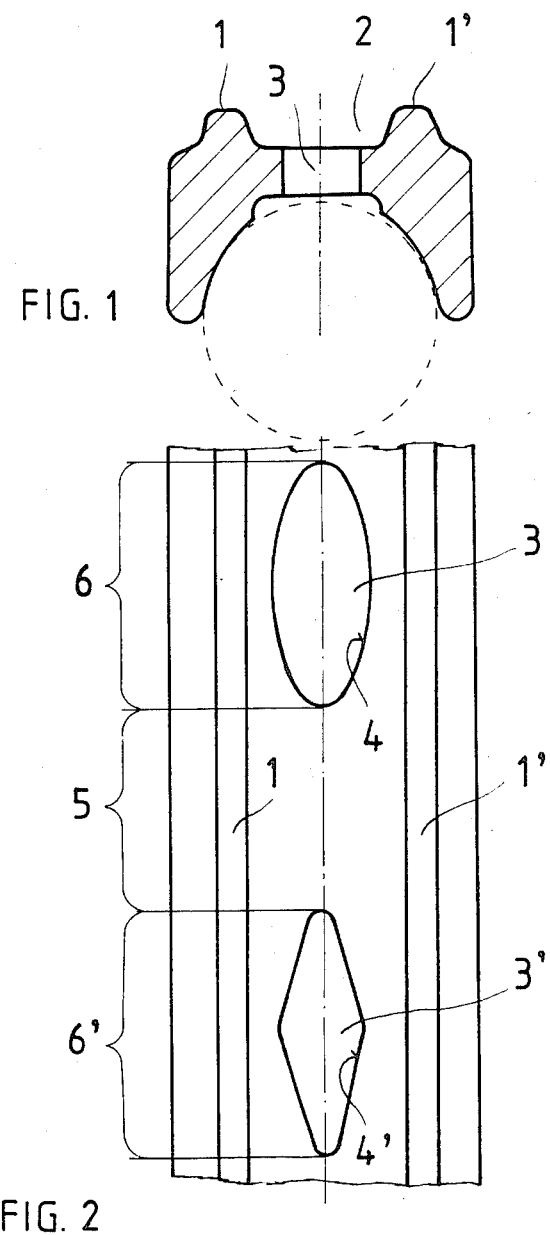
FIG. 1, a cross-sectional view of an oil scraping piston ring made of steel according to the invention.
FIG. 2, a top view of the oil scraping piston ring of FIG. 1 and two hole geometries.

FIG. 1 shows an oil scraping piston ring made of profiled steel and provided with two running webs (1, 1') as well as a circumferential groove (2) in the external circumferential face, with oil vent holes (3) being punched into the region of the groove.

FIG. 2 shows two selectively usable hole geometries (4, 4') for the oil vent holes (3, 3'). According to the above-described relationships, the proposed invention produces a sufficiently good parallelism of the running webs to develop in the circumferential regions (5 and 6, 6') of the running webs (1, 1') so that uniform surface pressure results over the entire circumference and thus optimum lubrication of the running track.

We claim:

1. An oil scraping piston ring for use within a cylinder of an internal combustion engine, the cylinder having an inner wall, comprising at least one web for lying against the inner wall of the cylinder, said at least one web having an external circumferential face for facing the wall, a circumferential groove in said face, and elliptically shaped radial oil vent holes opening into said groove.

2. Oil scraping piston ring according to claim 1, wherein the larger extent of the oil vent holes is in the circumferential direction of said groove.

3. In an internal-combustion engine having a cylinder wall and an oil scraping piston ring having at least one web lying against said cylinder wall, said at least one web having an external circumferential face having a groove therein, the improvement wherein said at least one web has elliptically-shaped radial oil vent holes opening into said groove.

4. An internal combustion engine as in claim 3, wherein the larger extent of the oil vent holes is in the circumferential direction of said groove.

* * * * *